United States Patent
Cabano et al.

(10) Patent No.: US 7,418,268 B1
(45) Date of Patent: Aug. 26, 2008

(54) METHOD FOR FINDING MEMBERS OF A COMMON INTEREST GROUP

(75) Inventors: Claudio Cabano, Bern (CH); David Perels, Zürich (CH); Adriano Huber, Locarno (CH)

(73) Assignee: Swisscom Mobil AG, Bern (CH)

( * ) Notice: Subject to any disclaimer, the term of this patent is extended or adjusted under 35 U.S.C. 154(b) by 0 days.

(21) Appl. No.: 09/890,702

(22) PCT Filed: Sep. 29, 1999

(86) PCT No.: PCT/CH99/00463

§ 371 (c)(1),
(2), (4) Date: Jan. 9, 2002

(87) PCT Pub. No.: WO01/24551

PCT Pub. Date: Apr. 5, 2001

(51) Int. Cl.
*H04B 7/00* (2006.01)
*H04Q 7/20* (2006.01)

(52) U.S. Cl. .............. 455/518; 455/41.2; 455/519; 455/456.1; 455/456.3

(58) Field of Classification Search ... 455/456.1–456.3, 455/518, 519, 41.2, 41.3
See application file for complete search history.

(56) References Cited

U.S. PATENT DOCUMENTS

| | | | | |
|---|---|---|---|---|
| 5,928,325 A * | 7/1999 | Shaughnessy et al. | ....... | 709/206 |
| 5,970,417 A * | 10/1999 | Toyryla et al. | ............... | 455/519 |
| 6,002,768 A * | 12/1999 | Albanese et al. | ............ | 713/175 |
| 6,047,272 A * | 4/2000 | Biliris et al. | ................. | 705/400 |
| 6,233,248 B1 * | 5/2001 | Sautter et al. | ............... | 370/465 |
| 6,253,091 B1 * | 6/2001 | Naddell et al. | ............... | 455/519 |
| 6,304,558 B1 * | 10/2001 | Mysore | ....................... | 370/312 |
| 6,400,942 B1 * | 6/2002 | Hansson et al. | .......... | 455/426.1 |
| 6,411,816 B1 * | 6/2002 | McDonald et al. | .......... | 455/518 |
| 6,529,735 B1 * | 3/2003 | De Brito | ................... | 455/456.1 |
| 6,542,749 B2 * | 4/2003 | Tanaka et al. | ............. | 455/456.1 |
| 6,570,970 B2 * | 5/2003 | Gruchala et al. | ........ | 379/127.01 |
| 6,571,279 B1 * | 5/2003 | Herz et al. | ................... | 709/217 |
| 6,600,928 B1 * | 7/2003 | Ahya et al. | .................. | 455/518 |
| 6,721,410 B1 * | 4/2004 | Will | ....................... | 379/202.01 |
| 6,763,300 B2 * | 7/2004 | Jones | .......................... | 701/201 |
| 2004/0002348 A1 * | 1/2004 | Fraccaroli | ................ | 455/456.3 |
| 2004/0116073 A1 * | 6/2004 | Mauney et al. | .............. | 455/41.2 |

FOREIGN PATENT DOCUMENTS

| | | |
|---|---|---|
| EP | 0 717 545 A3 | 6/1998 |
| EP | 0 905 956 A2 | 3/1999 |
| FR | 2 615 957 | 12/1988 |
| WO | 0 717 545 A2 | 6/1996 |
| WO | 97/41654 | 11/1997 |
| WO | 0 905 956 A3 | 6/1999 |
| WO | 00/22860 | 4/2000 |

* cited by examiner

*Primary Examiner*—Sujatha Sharma
(74) *Attorney, Agent, or Firm*—Pearne & Gordon LLP

(57) ABSTRACT

Method for finding members of a common interest group with a mobile device (1), in which at least one database (50) is built, in which a plurality of interest groups are stored. These interest groups contain mobile radio network users; the database (50) is filed in at least one server (5), accessible from within a radio network (3).

Each time a member is located in the vicinity of another member of a common interest group, he is automatically sent a message.

53 Claims, 1 Drawing Sheet

METHOD FOR FINDING MEMBERS OF A COMMON INTEREST GROUP

FIELD OF THE INVENTION

The present invention concerns a method that allows users of terminals to find members of a common interest group.

RELATED ART

Personal portable terminals under the name "Lovegetty" are already known that allow the selection of a user specific parameter, for example a color, and that generate a sound if another device with the same parameter selection is nearby. Such terminals are used as toys and allow only a single selection of parameters (e.g. colors) within a very limited predefined list stored in the terminal.

Furthermore, so-called newsgroups are known in the Internet, in which Internet users with common interests can send and receive messages. There are worldwide thousands of active newsgroups for nearly all conceivable interests, so that it is possible to search and find Internet users worldwide with very similar interests. But as many of the Internet users remain anonymous, these newsgroups are hardly ideal for meeting physically other people with similar interests and/or needs.

BRIEF SUMMARY OF THE INVENTION

It is one aim of the invention to propose a method with which it is possible to find members of a common interest group.

According to the present invention, these aims are achieved especially through the characteristics of the independent claims. Further advantageous embodiments are moreover described in the dependent claims and in the description.

These aims are achieved specifically by establishing at least one database in which a multitude of interest groups are stored, these interest groups including users of terminals, and the database being stored in at least one server that is reachable from a radio network, and by sending one message to at least one participant when he is close to another member of a common interest group.

This has the advantage that members who have registered in an interest group are alerted as soon as there are other members of this interest group in the near vicinity.

In one variant embodiment, the location of all the registered members of an interest group is continually being watched by a server that according to predefined criteria sends a message each time two members of a common interest group are in close proximity to each other.

In another variant embodiment at least certain mobile devices are equipped with a close-range contactless interface and search on their own for other devices of members of common interest groups within reach.

DESCRIPTION OF THE DRAWINGS

The invention will be better understood with reference to the following description of preferred embodiments illustrated by the attached drawings containing the FIGUREs, in which.

Figure 1:
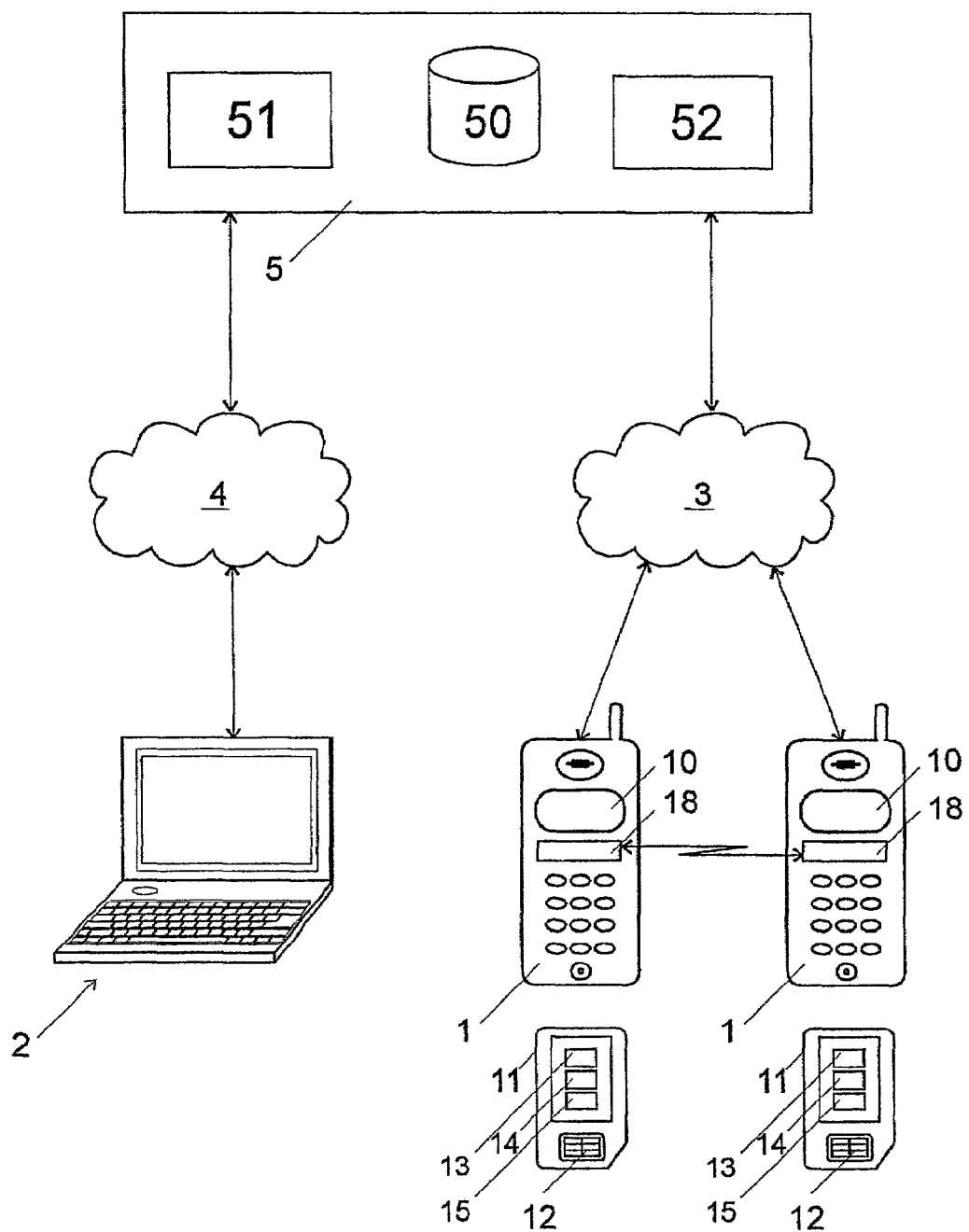
FIG. 1 shows an example of a system in which the method according to the invention can be applied.

Although the invention describes in more detail the specific case of the embodiment in a GSM cellular network, an expert will understand that this method can also be used with other types of networks, such as for example AMPS, TDMA, CDMA, TACS, PDC, HSCCD, GPRS, EDGE or UMTS cellular networks, or with pager systems or also in a contactless LAN or a personal network according to Bluetooth. Furthermore, the method according to the invention can also be used with a broadcasting network, for example with radio and/or video receivers such as DAB or DVB receivers (Digital Audio Broadcasting resp. Digital Video Broadcasting).

DETAILED DESCRIPTION OF THE INVENTION

FIG. 1 shows schematically a radio network 3 in which various mobile devices 1 are registered. The mobile devices 1 are preferably WAP (Wireless Application Protocol) enabled mobile radio devices or MeXe-devices and preferably comprise a well-known radio part, a display 10 and well-known input and output means. An identification module 11, for example a SIM or WIM card (Subscriber Identification Module resp. WAP Identification Module) is preferably connected over a contact area 12 with the terminal 1 and includes a processor in which user specific data are stored. As explained below, these data contain in addition to the known GSM and/or WAP data the following information:

Information 13 about the interest group where the terminal user is registered,

Possibly one or more certificates 14 issued by third parties for the authentication of membership in a particular interest group, A certificate 15 for the authentication of the terminal user in the cellular network.

The mobile device 1 can also be integrated into a wristwatch, a chip card or a key ring. In this case, there is no need for the display 10, the card 11 and the speech communication part. In one variant embodiment, the mobile device consists of a radio receiver, for example a DAB or DVB radio receiver.

At least certain mobile devices 1 preferably comprise a contactless interface 18 that allows contactless connection at close range (for example several meters or several hundred meters). In a preferred embodiment, the contactless interface consists of a radio interface, for example a Bluetooth interface or an inductive interface. In another embodiment, the contactless interface consists of an infrared interface, for example according to the IrdA protocol. The contactless interface can be integrated for example into the case of the mobile device 1, into the set of batteries (not shown), into the identification module 11 and/or in an additional module (not shown). Jini components (registered trademark of SUN) can furthermore be used to ensure the synchronization of the devices that are communicating over the contactless interface.

The system comprises furthermore at least one internet terminal 2, for example a PC, a laptop, a mediaphone or a WAP-enabled mobile phone that is connected to the internet or to the WAP net 4 respectively.

A server 5 connected to the radio mobile network 3 and preferably also to the Internet 4 contains a database 50 in which a multitude of interest groups are stored. Each interest group comprises a list of members who are registered by means of certificates and preferably a description, for example a group name and/or a more precise description of the interest group.

The interest groups in the database 50 can preferably be organized hierarchically. Thus, different groups with similar interests can for instance be grouped together, which facilitates the search for relevant groups and makes possible a search for partners with similar though not identical interests. With various conceivable procedure steps each member can preferably build new interest groups or conglomerates of interest groups, where the establishment and/or administration of an interest group may be billed.

The server 5 furthermore preferably comprises location determining means 51 or can access such location determining means. The location determining means can comprise information about the location of the users of the terminals 1. In a first variant embodiment, the location determining means simply consist of the home data HLR (Home Location Register) of the mobile radio network 3 in which details are available about the cell of the network in which the user is presently located. In another variant embodiment, the user's location within a cell is determined more accurately on the basis of signals from different base stations. In another variant embodiment, the location of each mobile device 1 is determined with location determining means integrated in the mobile device, for example a GPS (Global Positioning System) receiver.

The server 5 further comprises a database 52 in which criteria for sending member-specific or interest group-specific messages are stored. For each member, this database stores a definition of when a message has to be sent, for example at what distance to the next member of each interest group, or which members are excluded.

The server 5 can for example be administered by the operator of the mobile network 3. In this case, the registration of a member in an interest group and/or the sending of a message can be billed by said operator, for example with the monthly telephone bill or by crediting a prepaid account on the member's identification module 11. A task code can also be combined with certain interest groups so that the registration can be carried out more easily and be billed by the manager of this group with the method described in patent WO9828900.

The server 5 can however also be administered by other companies that finance themselves through subscriptions or advertising and that receive the information about the user' location either directly from the correspondingly equipped subscribing user or from the operator of the mobile network 3.

Furthermore, the method can also be used internationally by connecting several servers 5 that are administered by several operators in different countries or regions. In this case, a member can find other members of common interest groups even if they are abroad or in an area that is not covered by the home network provider. Information from the database 50 and/or 52 can moreover be commercialized, for example by an information broker.

We will now describe in more detail the method according to the invention.

A user of a terminal who wants to find other members with common interests must first be registered with the interest groups relevant to him.

To self-register, the user of a terminal can in a first variant retrieve a directory of the groups available in the database 50 on the display 10 of his mobile device 1 and select the interest group that interests him. The group directory can be made available for example by WAP services.

In another embodiment, the user can send a registration message, for example an SMS (Short Message System), USSD (Unstructured Supplementary Service Data) or WAP message, a GPRS packet or an e-mail to the server 5. The registration message in this case contains an identification of the interest group, which has been made known for example through advertising. This registration message is signed preferably with the certificate 15 and preferably in the identification module 11, thus enabling the server 5 to check the user's identity and the messages' integrity.

In another embodiment, the user can register with one ore several interest groups with an Internet terminal 2, for example a PC, a laptop, a palmtop or a WAP-enabled mobile phone.

In yet another embodiment, the user can also register with an interest group by telephone (for example automatically by voice message with a voice server), by fax or by letter.

Preferably, a manager manages at least certain interest groups. This group manager can preferably decide which users can register with the group. Preferably, the manager can himself register members with a group. In this manner, the administration of a school or university can for example register all students and former students using a mobile device in order to facilitate future contacts among the students. In the same way a company can unite all employees in a company group.

The registration with an interest group can be certified preferably by the manager of this group with an electronic certificate stored in the database 50 or preferably in the identification module 11. The administration of a school for example can distribute a certificate to all former students to enable them to reliably authenticate themselves as former students.

If the necessary trust relationship exists, certificates issued by third parties may also be used.

The registration in an interest group can preferably be time-limited, where the maximum duration of registration can be defined by the manager of each group and/or the operator of the server 5. If the registration with a certain group is not free of charge, then the required fee can be dependent on the duration of the registration.

The members of an interest group can preferably determine themselves the criteria for the sending of messages. For example, they can determine when the messages have to be sent to them. This selection can preferably be made independently for each group and will be stored in the database 52.

For each interest group, a member can decide for example that he automatically wants to receive a message when another member of this group is nearby. For other groups, he may define that he only wants to receive messages on request and upon demand. Other criteria for sending messages can depend on time ("I only want to receive messages during daytime") and/or location ("I only want to know whether there are colleagues from work nearby when I'm abroad"). For certain interest groups and/or certain group members for example it is possible to define that a message needs only be sent if the members are located at predefined meeting points. The operator of these meeting points (for example department stores, railway stations, airports, entertainment facilities etc.) can possibly also manage these interest groups.

The sending criteria can be predefined preferably by the operator of the server 5 and/or the manager of the interest group.

Furthermore, the sending criteria in database 52 can also indicate the maximal distance between the members for a message to be sent. This distance can preferably be set by the operator of the radio network, the group managers and/or the members.

Preferably, members can furthermore register only temporarily with an existing group, for example to carry out a once only person search. Conversely, members of a group can temporarily cancel their membership from a group if they do not want to receive any more messages and if they furthermore do not want their presence signaled to other members. Preferably, group managers can restrict the right to temporarily enter or leave a group.

The members can furthermore store a member profile in database 50. This database contains in this case identification characteristics allowing the identification of the members. These characteristics can comprise, for example, a picture of the member and/or their hair color, the make and color of their car, their car registration number etc. Preferably, these characteristics furthermore contain the member's telephone number and/or e-mail address to allow other members of a common interest group to contact them. In a variant embodiment described further below, these characteristics further comprise an identification of the member that can be used for the close range connection over a contactless interface. This identification can be used for example for a communication over a Bluetooth interface.

Each member can preferably decide which characteristics may be sent to other members of the common interest group. A member can for instance decide that he wants to remain anonymous to other members of a first interest group, so that they only receive a message that a group member is in their vicinity. In a second group, he can decide for example that only his telephone number may be communicated, whereas the members of a third group are allowed to receive further identification characteristics. In another group, he can for example communicate only an alias.

We will now describe a first main variant embodiment of the invention.

In this first variant, the server 5 receives continuous information from the location determining means 51 about the location of all registered users of terminals 1. A suitable program on the server 5 then checks whether certain sending criteria in the database 52 are fulfilled and whether members of common interest groups are within a certain distance of each other.

Depending on the sending criteria, this test is being run continuously for all possible pairs of members or only on request of a member asking for other members of common interest groups.

If the server 5 finds sending criteria which are fulfilled, i.e. when two members of a common interest group are in proximity to each other, a message is prepared and sent to one or both members. Depending on the variant and/or the defined sending criteria, this message can consist for example of a SMS, USSD, WAP, GPRS or e-mail message.

Alternatively, this message can be transmitted over a broadcasting system, for example as data accompanying a program in a DAB program (Digital Audio Broadcasting).

The member who has received the message signaling the presence of another member of a common interest group can decide whether he wants, for example, to reject this message since he does not look for contact or, on the contrary, to communicate with the other member by telephone or directly. For a connection over the telephone, the member can use the telephone number that is preferably contained in the message and/or the e-mail address of the other member. In one variant embodiment, a directory, for example a WAP whitebook, can be used to find the telephone number or e-mail address of the other member. This connection can be established preferably with a suitable program, with simple menu selection and without the need for the message receiver to re-dial the telephone number. The suitable program can for example also be transmitted as an applet within the message.

If the member wants to get into direct contact with the other member of a common interest group, he can identify the latter with the help of the user characteristics—such as the color of the car and the car registration number—contained in the message, depending on user preferences.

The member preferably also has a storage area in his identification module 11 or his terminal 1 where he can file these user characteristics.

The user of the terminal who received from the server 5 the message that another member of a common interest group is nearby, can also contact this mobile user directly at close range with the contactless interface 18. Preferably, the message sent by the server 5 contains those identifications of other members that are necessary for the transmission of data over this contactless interface.

If membership to an interest group is certified by a certificate 14, the message between the members can preferably be signed by this certificate. In this way, each member can check the authenticity of the other members.

We will now describe more closely a second main variant embodiment of the invention.

In this second variant, at least certain terminals 1 can at close range search for other mobile devices in the vicinity over said contactless interface ("Poll-search"). If another device answers this query (automatically or after a confirmation of the user), it is possible to check with the database 50 whether this other terminal belongs to a member of a common interest group. If additional security is required, the certificate 14 of the other device can be checked in the identification module 11. If a member of a common interest group has been found and identified in this way, a message can be sent over the contactless interface and/or over the radio network 3.

This method can be used, for example, to find persons with common interests, for example to find former student colleagues in a foreign city, to find players for a game, to organize appointments, to find and authenticate participants at a congress etc.

The server 5 can also be used to send messages to all members of an interest group.

The invention claimed is:

1. A method for finding members of a common interest group with a mobile device, said method comprising the steps of:
   building at least one database in which a plurality of interest groups are stored, these interest groups comprising users of terminals,
   storing the database in at least one server accessible from within a radio network,
   sending a message to at least one of said members if he is in the vicinity of another of said members of the common interest group, wherein said message includes identification characteristics, and
   said mobile device providing said identification characteristics to said at least one of said members for enabling the identification of the another of said members by the one of said members.

2. The method of claim 1, wherein location determining means are provided that monitor the location of a plurality of members, and wherein said message is prepared by said server if it recognizes on the basis of the results of said location determining means that two members of the same interest group are in each other's vicinity.

3. The method of claim 2, wherein said location determining means determine the location of members through signals from a location determining satellite.

4. The method of claim 2, wherein said location determining means determine the location of members through signals from a plurality of basis stations in the radio network.

5. The method of claim 1, wherein said message is sent as an SMS message.

6. The method of claim 1, wherein said message is sent as an USSD message.

7. The method of claim 1, wherein said message is sent as a GPRS packet.

8. The method of claim 1, wherein said message is sent as an IP packet.

9. The method of claim 1, wherein said message is sent as an e-mail.

10. The method of claim 1, wherein certain members decide that a message should be sent to them each time a member of a common interest group is nearby.

11. The method of claim 1, wherein certain members decide that they want to receive messages only when they send a specific demand to said server.

12. The method of claim 1, wherein
at least certain mobile devices contain a close-range contactless interface, and wherein
these mobile devices send said message over said contactless interface as soon as they find another mobile device in the vicinity belonging to a member of a common interest group.

13. The method of claim 1, wherein the member can self-register in an interest group.

14. The method of claim 13, wherein the members can register with an interest group with their mobile devices.

15. The method of claim 14, wherein the members can register with an interest group with a registration message prepared with their mobile devices.

16. The method of claim 13, wherein the members can register with a voice message.

17. The method of claim 12, wherein the members can register with a interest group by Internet.

18. The method of claim 1, wherein third parties register members with an interest group.

19. The method of claim 1, wherein membership with a group is certified.

20. The method of claim 1, wherein membership with a group is certified by third parties.

21. The method of claim 20, wherein third parties file a registration certificate in said database.

22. The method of claim 21, wherein third parties file a registration certificate in the mobile devices of said members.

23. The method of claim 1, wherein at least certain members are only registered temporarily in an interest group.

24. The method of claim 23, wherein the membership is time-limited.

25. The method of claim 1, wherein said database is managed by the operator of said radio network, and wherein the registration with a group and/or the sending of said message is billed by said operator.

26. The method of claim 1, wherein said database is managed by third parties.

27. The method of claim 1, wherein said message is electronically signed.

28. The method of claim 1, wherein said message is electronically encrypted.

29. The method of claim 1, wherein the maximum distance between the members of a common interest group is determined by the manager of said interest group in order to send said message.

30. The method of claim 1, wherein the maximum distance between the members of a common interest group is determined by said member in order to send said message.

31. The method of claim 1, wherein certain members temporarily prevent messages from being sent to them about the presence of members of common interest groups.

32. The method of claim 1, wherein certain members temporarily prevent messages from being sent to them about their present location to other members of common interest groups.

33. The method of claim 1, wherein said message contains the telephone number of said nearby member.

34. The method of claim 33, wherein said telephone number is not displayed.

35. The method of claims 33, wherein the member, having received a said message, can build a connection with said member of a common interest group without typing this member's telephone number.

36. The method of claim 1, wherein said message contains an identification of said participant that is necessary for a connection over the close-range contactless interface.

37. The method of claim 36, wherein said close-range contactless interface is a Bluetooth interface.

38. The method of claims 36, wherein said member, having received said message, can build a direct connection with said nearby member over said contactless interface.

39. A system with which members of a common interest group can find other members, comprising:
at least one server accessible from a radio network, in which at least one database including a plurality of interest groups stored therein, these interest groups comprising mobile phone users,
location determining means for monitoring the location of the members,
means for determining if one or more of the members of the common interest group are simultaneously situated within a predefined distance of each other,
means for sending messages if it is determined that said one or more of the members of the common interest group are simultaneously situated within said predefined distance of each other, wherein said message includes identification characteristics, and
said mobile device including means for providing said identification characteristics to said members for enabling said members to recognize said one or more of said members.

40. A method for finding members of a common interest group with a mobile device, said method comprising the steps of:
building at least one database in which a plurality of interest groups are stored, these interest groups comprising users of terminals, said database including identification characteristics for at least some of the users;
storing the database in at least one server accessible from within a radio network,
sending a message including said identification characteristics for one of said members to at least another of said members if he is in the vicinity of the another of said members of the common interest group,
and
specifically billing a party for said sending of said message.

41. A method for finding members of a common interest group with a mobile device, said method comprising the steps of:
building at least one database in which a plurality of interest groups are stored, these interest groups comprising users of terminals,
storing the database in at least one server accessible from within a radio network,
storing a predetermined message criterion different from membership in said common interest group for determining when a message is sent to one of said members; and sending said message to the one of said members if he is in the vicinity of another of said members and only if said message criterion is satisfied, wherein said message contains physical identification characteristics that enable the personal recognition of the another of said members by the one of said members.

42. The method of claim 41, wherein said message criterion is an acceptable time period.

43. The method of claim 41, wherein said message criterion is an acceptable location.

44. The method of claim 41, wherein said message criterion is a location at a predefined meeting place.

45. The method of claim 41, wherein said message criterion is a permission provided by the another of said members to send said message.

46. The method of claim 41, wherein said message criterion is a permission provided by said one of said members to receive said message.

47. The method of claim 1, wherein said identification characteristics have been previously stored in said database.

48. The method of claim 1, wherein said graphical image information includes a digital photograph.

49. The system of claim 39, wherein said identification characteristics include graphical image information has been previously stored in said database.

50. A method for finding members of a common interest group, said method comprising the steps of:

providing a database for storing a plurality of digital photographs, wherein each of said photographs corresponds to a different one of the members, storing the database in at least one server accessible from within a radio network, determining when one of said members is in the vicinity of another of said members utilizing a mobile device of the one of said members and a mobile device of the another of said members;

sending the digital photograph corresponding to the one of said members to the mobile device of the another of said members when it is determined that the one of said members is in the vicinity of the another of said members, and utilizing said mobile device of the one of said members for enabling the visual identification of the another of said members by the one of said members.

51. A method for finding members of a common interest group, said method comprising the steps of:

providing a database for storing identifying information about each of said members, storing the database in at least one server accessible from within a radio network, determining when one of said members is in the vicinity of another of said members utilizing a mobile device of the one of said members and a mobile device of the another of said members;

sending said identifying information corresponding to the one of said members to the mobile device of the another of said members when it is determined that the one of said members is in the vicinity of the another of said members, said mobile device of the one of said members using said identifying information for display to the one of said members for enabling identification of the another of said members by the one of said members, and the one of said members getting into direct contact with the another of said members by using the displayed identifying information for identifying the another of said members.

52. A method for finding members of a common interest group with a mobile device, said method comprising the steps of:

building at least one database in which a plurality of interest groups are stored, users of terminals being members of these interest groups, providing at least one server accessible from within a radio network for utilizing said database, and said server sending a message to at least one of said members if he is in the vicinity of another of said members of the common interest group, wherein said message contains personal profile information related to the another of said members.

53. A method for finding members of a common interest group, said method comprising the steps of:

providing a database for storing identifying characteristic about each of said members, said identifying characteristic being a picture of said members, storing the database in at least one server accessible from within a radio network, determining when one of said members is in the vicinity of another of said members utilizing a mobile device of the one of said members and a mobile device of the another of said members;

sending said identifying characteristic corresponding to the one of said members to the mobile device of the another of said members when it is determined that the one of said members is in the vicinity of the another of said members, said mobile device of the one of said members displaying said identifying characteristic to the one of said members for enabling identification of the another of said members by the one of said members, and the one of said members getting into direct contact with the another of said members by using the displayed identifying characteristic for identifying the another of said members.

\* \* \* \* \*

UNITED STATES PATENT AND TRADEMARK OFFICE
CERTIFICATE OF CORRECTION

PATENT NO. : 7,418,268 B1 Page 1 of 1
APPLICATION NO. : 09/890702
DATED : August 26, 2008
INVENTOR(S) : Claudio Cabano, David Perels and Adriano Huber It is certified that error appears in the above-identified patent and that said Letters Patent is hereby corrected as shown below:

ON THE COVER PAGE:

Item (73) Assignee: Please delete the word "Mobil"; replace it with --Mobile--

Signed and Sealed this

Second Day of December, 2008

JON W. DUDAS
*Director of the United States Patent and Trademark Office*